United States Patent
Hara

(10) Patent No.: US 8,659,673 B2
(45) Date of Patent: Feb. 25, 2014

(54) IMAGE PROCESSING APPARATUS, IMAGE PROCESSING METHOD, PROGRAM, AND STORAGE MEDIUM FOR CORRECTING CHROMATIC ABERRATION

(75) Inventor: Takayuki Hara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/612,609

(22) Filed: Sep. 12, 2012

(65) Prior Publication Data

US 2013/0002909 A1  Jan. 3, 2013

Related U.S. Application Data

(63) Continuation of application No. 12/848,882, filed on Aug. 2, 2010, now Pat. No. 8,305,458, and a continuation of application No. PCT/JP2009/063044, filed on Jul. 21, 2009.

(51) Int. Cl.
*H04N 5/228* (2006.01)
*H04N 9/64* (2006.01)
*H04N 9/73* (2006.01)
*G06K 9/36* (2006.01)
*G06K 9/38* (2006.01)

(52) U.S. Cl.
USPC ............ 348/222.1; 348/223.1; 348/654; 382/167; 358/515

(58) Field of Classification Search
CPC ........... H04N 5/228; H04N 9/64; H04N 9/73; G06K 9/36; G06K 9/38
USPC ........... 348/222.1, 223.1, 242, 256, 246, 234, 348/653; 382/162, 163, 164, 165, 218, 272, 382/254; 358/515, 518; 345/600, 604
See application file for complete search history.

(56) References Cited

U.S. PATENT DOCUMENTS

| | | | |
|---|---|---|---|
| 6,483,941 B1 * | 11/2002 | Li | 382/167 |
| 7,346,210 B2 * | 3/2008 | Chen | 382/162 |
| 7,656,444 B2 * | 2/2010 | Hara | 348/246 |
| 7,667,738 B2 * | 2/2010 | Utsugi | 348/222.1 |
| 2005/0069218 A1 | 3/2005 | Chen | |
| 2008/0007630 A1 | 1/2008 | Hara | |
| 2008/0062409 A1 | 3/2008 | Utsugi | |
| 2011/0135213 A1* | 6/2011 | Hatakeyama | 382/254 |

FOREIGN PATENT DOCUMENTS

| | | |
|---|---|---|
| CN | 1806449 A | 7/2006 |
| JP | 2005167896 A | 6/2005 |

* cited by examiner

*Primary Examiner* — Nhan T Tran
*Assistant Examiner* — Marly Camargo
(74) *Attorney, Agent, or Firm* — Canon USA Inc. IP Division

(57) ABSTRACT

There is a problem in that when magnification chromatic aberration correction is carried out, the difference in reproducibility of high-frequency components, depending on the spatial position, between a color for which position shift correction is not performed and a color for which position shift correction is performed may influence the image quality of an output image. In order to perform magnification chromatic aberration correction, high-frequency components, which are lost due to the position shift correction of a color for which position shift correction is carried out, are extracted from a color for which position shift correction is not carried out, and are added to the color for which position shift correction is carried out. Therefore, the high-frequency components are restored in a pseudo manner.

5 Claims, 9 Drawing Sheets

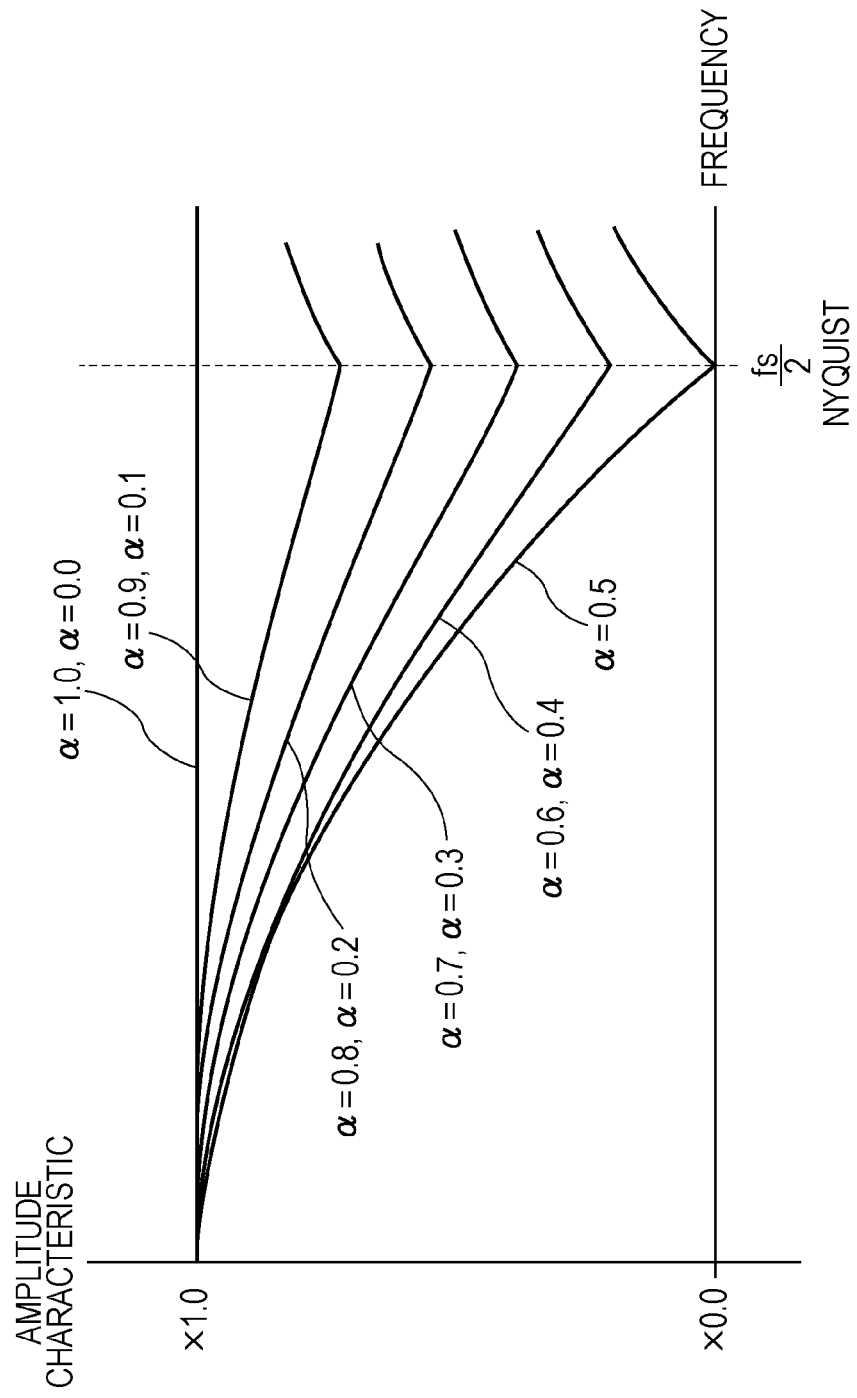

IMAGE PROCESSING APPARATUS, IMAGE PROCESSING METHOD, PROGRAM, AND STORAGE MEDIUM FOR CORRECTING CHROMATIC ABERRATION

CROSS REFERENCE TO RELATED APPLICATIONS

This application is a Continuation application of U.S. Ser. No. 12/848,882 filed Aug. 2, 2010 which claims priority to International Application No. PCT/JP2009/063044, filed Jul. 21, 2009, which is hereby incorporated by reference herein in its entirety.

BACKGROUND OF THE INVENTION

1. Technical Field

The present invention relates to a method for correcting chromatic aberration that occurs in an image.

2. Background Art

Images obtained by photographing contain a color shift caused by chromatic aberration of a lens used for the photographing.

One of methods for detecting such a color shift is a method of storing in advance the amount of color shift corresponding to a state of the lens (see, for example, PTL 1). Alternatively, another method is a method of calculating the amount of shift in position between different color signals in an image by calculating correlation between the color signals, and detecting the amount of color shift (see, for example, PTL 2). n amount of color shift is a continuously changing value. Thus, in order to correct the amount of color shift determined in the above manner in a digital image, it is necessary to correct the amount of color shift in units of less than one pixel. Interpolation algorithms such as bilinear interpolation and bicubic interpolation have been proposed as methods for correcting the amount of color shift in units of less than one pixel.

In bilinear interpolation, bicubic interpolation, or other similar interpolation computations, an FIR filter whose coefficient changes depending on the interpolation position is used. If these interpolation computations are used, the manner in which bands disappear is different depending on the shift position, resulting in variations in the passband in an output image. Thus, a problem occurs in that image quality is impaired.

The reason for the difference in the manner in which bands disappear in the bilinear interpolation will be described.

FIG. 10 is a diagram illustrating a computation using bilinear interpolation. P1, P2, P3, and P4 represent the centers of gravity of four pixels arranged vertically and horizontally on an image pickup element. In order to obtain a signal level at coordinates Q that are located between the centers of gravity P1 to P4 and that do not match those of the center of gravity of any pixel arranged on the image pickup element, it is necessary to compute the signal level by interpolation from the signal levels of the neighboring pixels having the centers of gravity P1 to P4. $\alpha$ and $\beta$ represent the amounts of shift at the coordinates Q from the centers of gravity P1 to P4. In bilinear interpolation, when the signal levels at the centers of gravity P1, P2, P3, and P4 are represented by Ps1, Ps2, Ps3, and Ps4, respectively, the signal level at the coordinates Q, Qs, is determined using Equation (1):

$$Qs = \{(1-\alpha) \times Ps1 + \alpha \times Ps2\} \times (1-\beta) + \{(1-\alpha) \times Ps4 + \alpha \times Ps3\} \times \beta \quad (1)$$

Equation (1) is equivalent to the application of an FIR low-pass filter having two taps with coefficients $(1-\alpha)$ and $\alpha$ in the horizontal direction and the application of an FIR low-pass filter having two taps with coefficients $(1-\beta)$ and $\beta$ in the vertical direction. Therefore, the horizontal low-pass effect changes depending on the value of $\alpha$, and the vertical low-pass effect changes depending on the value of $\beta$. Note that $\alpha$ and $\beta$ take values in a range greater than or equal to 0 and less than or equal to 1.

FIG. 11 illustrates differences in the amplitude characteristics of the signal at the coordinates Q, which are caused by differences in the value of the amount of shift $\alpha$. When a is 0.0 or 1.0, the amplitude gain of signals at high frequencies including the Nyquist frequency is not reduced whereas when $\alpha$ is 0.5, the amplitude gain at the Nyquist frequency is 0. As $\alpha$ approaches 0.0 or 1.0, the amount of reduction in the amplitude gain at high frequencies centered on the Nyquist frequency decreases. As $\alpha$ approaches 0.5, the amount of reduction in the amplitude gain at high frequencies centered on the Nyquist frequency increases. The same applies to $\beta$ in the vertical direction.

Thus, if bilinear interpolation is used to determine a signal level at certain coordinates, in accordance with the distance therefore, the degree of disappearance of high-frequency components of the signal level differs. Referring to FIG. 10 by way of example, the degree of disappearance of high-frequency components of the signal level Qs increases in a region where the position of the coordinates Q is closer to the middle of the centers of gravity P1 to P4, and the degree of disappearance of high-frequency components of the signal level Qs decreases in a region where the position is closer to one of the centers of gravity P1 to P4. Since there are a large number of blocks having four pixels as above in an image, the correction of a color shift caused by magnification chromatic aberration may cause the presence of regions where an extremely large number of high-frequency components of the signal level are lost and regions where a not so large number of high-frequency components are lost, resulting in a patchy distribution of high-frequency components.

Another problem is that since the correction of chromatic aberration does not involve position shifting for the signal level of a color at a position reference point, variations of bands between a color for which position shifting is not performed and colors for which position shifting has been performed appear as degradation of image quality.

CITATION LIST

Patent Literature

PTL 1: Japanese Patent Laid-Open No. 8-205181
PTL 2: Japanese Patent Laid-Open No. 2006-020275

SUMMARY OF THE INVENTION

In order to solve the above problems, an image processing apparatus of the present invention includes an image obtaining unit adapted to obtain an image having a plurality of colors, the image being generated using an image pickup element including a plurality of pixels; a shift amount obtaining unit adapted to obtain an amount of shift of light flux of a second color with respect to light flux of a first color, the amount of shift being caused by optical characteristics of a lens through which light flux that arrives at the image pickup element is transmitted; a shift correcting unit adapted to interpolate a signal level of the second color at aberration coordinates from signal levels of pixels having the second color around the aberration coordinates, the aberration coordinates representing a position that is shifted from a position of a pixel of interest by the amount of shift; a high-frequency extracting unit adapted to extract a high-frequency signal level of the first color of the pixel of interest in accordance with a degree of reduction in a high-frequency signal level in the signal level of the second color at the aberration coordinates, the reduction being caused by interpolation performed by the shift correcting unit; and an output unit adapted to output, as a signal level of a pixel of the second color in the pixel of interest, a signal level obtained by adding the signal level extracted by the high-frequency extracting unit to a signal level of a pixel of the second color calculated by the shift correcting unit.

Also, in order to solve the above problems, an image processing method of the present invention includes an image obtaining step of obtaining an image having a plurality of colors, the image being generated using an image pickup element including a plurality of pixels; a shift amount obtaining step of obtaining an amount of shift of light flux of a second color with respect to light flux of a first color, the amount of shift being caused by optical characteristics of a lens through which light flux that arrives at the image pickup element is transmitted; a shift correcting step of interpolating a signal level of the second color at aberration coordinates from signal levels of pixels having the second color around the aberration coordinates, the aberration coordinates representing a position that is shifted from a position of a pixel of interest by the amount of shift; a high-frequency extracting step of extracting a high-frequency signal level of the first color of the pixel of interest in accordance with a degree of reduction in a high-frequency signal level in the signal level of the second color at the aberration coordinates, the reduction being caused by interpolation performed in the shift correcting step; and an output step of outputting, as a signal level of a pixel of the second color in the pixel of interest, a signal level obtained by adding the signal level extracted in the high-frequency extracting step to a signal level of a pixel of the second color calculated in the shift correcting step.

Further features of the present invention will become apparent from the following description of exemplary embodiments with reference to the attached drawings.

BRIEF DESCRIPTION OF THE DRAWINGS

FIG. 11 illustrates differences in amplitude characteristics of a signal at coordinates Q, which are caused by differences in the value of the amount of shift $\alpha$.

DESCRIPTION OF THE EMBODIMENTS

Embodiments of the present invention will be described hereinafter with reference to the accompanying drawings. Note that the technical scope of the present invention is defined by the claims and is not to be limited by the following individual embodiments. Also, all the combinations of features described in the embodiments are not necessarily essential to the present invention.

First Embodiment

Figure 1:
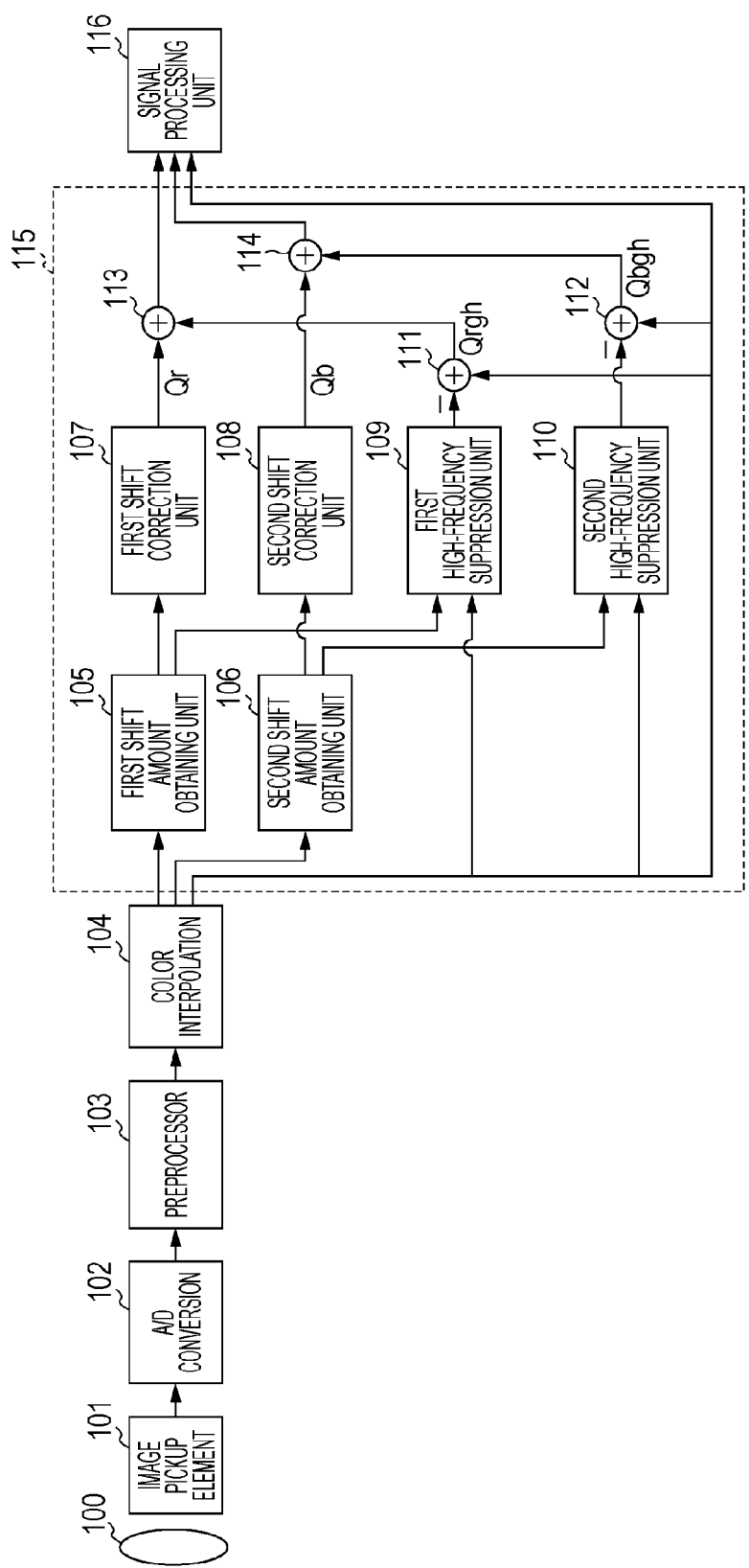
FIG. 1 is a block diagram illustrating a configuration of a digital camera according to a first embodiment of the present invention.

In the present embodiment, an image processing apparatus that corrects magnification chromatic aberration, which is one type of chromatic aberration, will be described in the context of a digital camera, by way of example. FIG. 1 is a block diagram illustrating a configuration of a digital camera according to the present embodiment.

In FIG. 1, a lens unit 100 includes a zoom lens and a focus lens. An image pickup element 101 has a Bayer pattern, which photoelectrically converts light flux transmitted through the lens unit 100 and arriving thereat and which includes a large number of pixels having color filters of red (R), green (G), and blue (B). The image pickup element 101 is formed of, for example, a CCD (Charge Coupled Device) or CMOS (Complementary Metal Oxide Semiconductor) image sensor. In the present embodiment, it is assumed that the image pickup element 101 is a CMOS image sensor. An A/D conversion unit 102 converts an image of an analog signal obtained from the image pickup element 101 into an image of a digital signal. The units from the lens unit 100 to the A/D conversion unit 102 constitute an image obtaining unit.

A preprocessor 103 performs defect correction, shading correction, white balance, and the like on a digital signal. A color interpolation unit 104 separates the digital signal output from the preprocessor 103 into signals of red, green, and blue colors and that interpolates a pixel which does not have a signal of a specific color with a signal of the specific color.

A first shift amount obtaining unit 105 calculates an amount of shift of a red signal output from the color interpolation unit 104 with respect to a green signal. A second shift amount obtaining unit 106 calculates an amount of shift of a blue signal output from the color interpolation unit 104 with respect to the green signal. A first shift correction unit 107 calculates a signal level in a pixel of interest after aberration correction from the level of the red signal output from the color interpolation unit 104 on the basis of the amount of shift of the red signal. A second shift correction unit 108 calculates a signal level at a pixel of interest after aberration correction from the level of the blue signal output from the color interpolation unit 104 on the basis of the amount of shift of the blue signal.

A first high-frequency suppression unit 109 low-pass filters the green signal output from the color interpolation unit 104 on the basis of the amount of shift of the red signal obtained by the first shift amount obtaining unit 105. A second high-frequency suppression unit 110 low-pass filters the green signal output from the color interpolation unit 104 on the basis of the amount of shift of the blue signal obtained by the second shift amount obtaining unit 106.

A first subtractor 111 subtracts a low-pass filtered green signal level, which is output from the first high-frequency suppression unit 109, from the level of the green signal output from the color interpolation unit 104. A second subtractor 112 subtracts a low-pass filtered green signal level, which is output from the second high-frequency suppression unit 110, from the level of the green signal output from the color interpolation unit 104. A first adder 113 adds the signal level output from the first subtractor 111 to the signal level output from the first shift correction unit 107. A second adder 114 adds the signal level output from the second subtractor 112 to the signal level output from the second shift correction unit 108.

A chromatic aberration correction unit 115 is constituted by the first and second shift amount obtaining units 105 and 106, the first and second shift correction units 107 and 108, the first and second high-frequency suppression units 109 and 110, the first and second subtractors 111 and 112, and the first and second adders 113 and 114.

A signal processing unit 116 receives as inputs the green signal output from the color interpolation unit 104, the red signal output from the first adder 113, and the blue signal output from the second adder 114. The signal processing unit 116 performs image luminance correction, edge enhancement correction, and the like using the input signals.

Next, the content of the process performed by the chromatic aberration correction unit 115 will be described in detail. Due to the transmission through the lenses, light is focused at different positions depending on the color, and chromatic aberration occurs. In order to correct the chromatic aberration, it is necessary to determine a reference color and to shift the positions of signals of other colors so as to match the position of the reference color. In the present embodiment, the chromatic aberration correction unit 115 uses the green signal as a reference.

Figure 2:
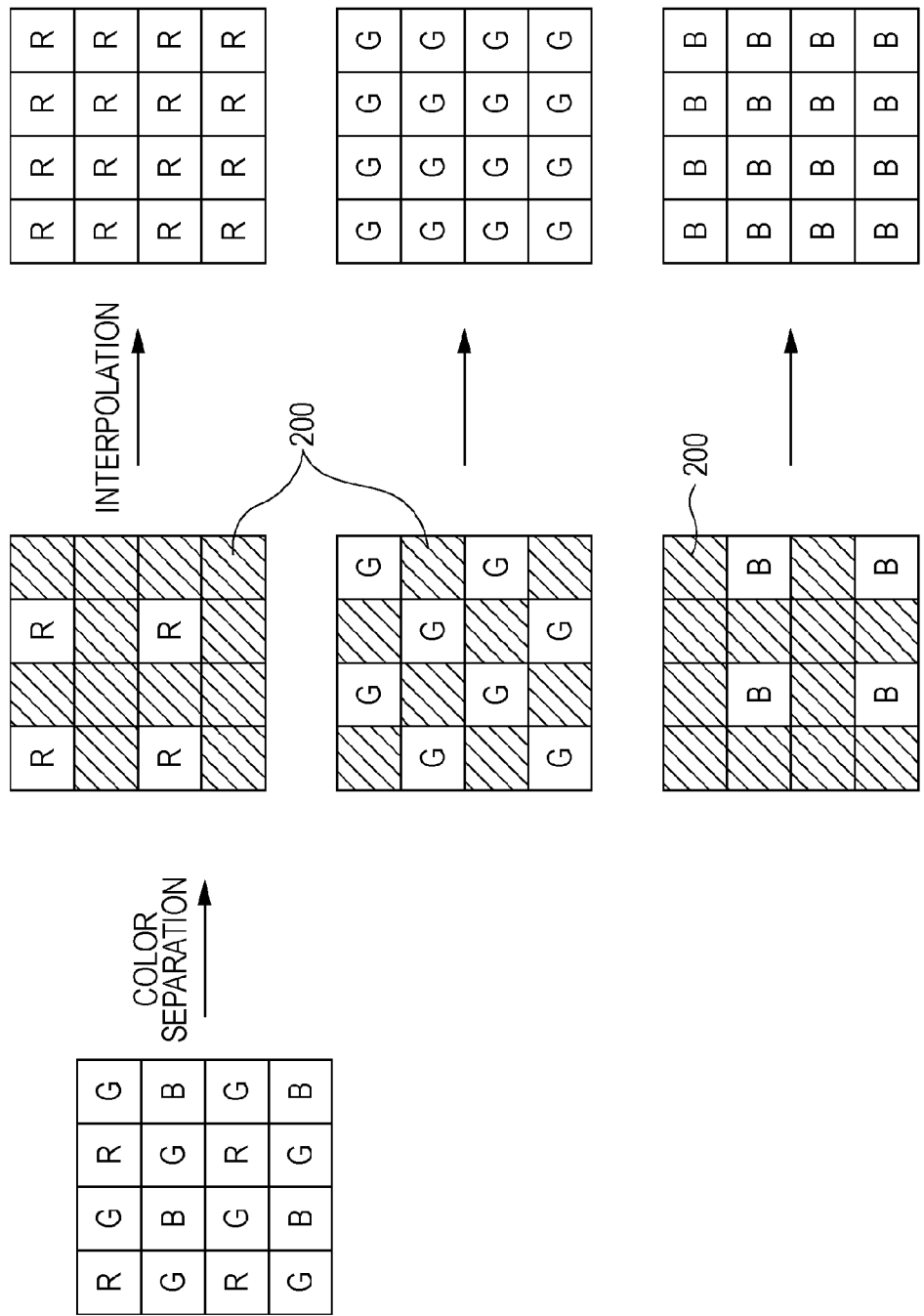
FIG. 2 is a diagram illustrating separation of an image into signals of respective colors and interpolation processing performed on the signals of the respective colors.

As illustrated in FIG. 2, the color interpolation unit 104 separates an input image having a Bayer pattern of the primary colors into the individual colors, and interpolates signals corresponding to missing pixels 200 of each color. The term missing pixels refers to pixels in separated images of respective colors, which do not have signals of those colors. In the example illustrated in FIG. 2, in an image having red signals, eight pixels adjacent to a pixel having a red signal, which are located at the vertical, horizontal, and diagonal positions, are missing pixels 200. In an image having green signals, four pixels vertically and horizontally adjacent to a pixel having a green signal are missing pixels 200. In an image having blue signals, eight pixels adjacent to a pixel having a blue signal, which are located at the vertical, horizontal, and diagonal positions, are missing pixels 200. The color interpolation unit 104 uses the signal level of a pixel having a signal of the same color among, for example, eight pixels adjacent to a missing pixel 200 at the vertical, horizontal, and diagonal positions to determine the average value thereof or the weighted sum thereof, and sets the resulting value as the signal level of the missing pixel 200.

The first shift amount obtaining unit 105 and the second shift amount obtaining unit 106 obtain the amounts of shift of the red and blue signals with respect to the green signal. There are various obtaining methods such as, as described above, reading the amount of chromatic aberration corresponding to a lens state, which is stored in advance, and detecting the amount of chromatic aberration from the amount of shift of a region having a high correlation between different color signals in an image. In the present embodiment, it is assumed that the first shift amount obtaining unit 105 and the second shift amount obtaining unit 106 store in advance in internal memories the amount of chromatic aberration corresponding to the state of the zoom lens in the lens unit 100.

Figure 3:
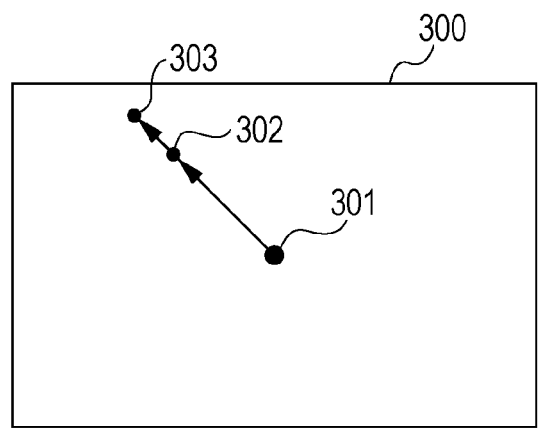
FIG. 3 is a diagram illustrating a position shift caused by chromatic aberration.

FIG. 3 is a diagram illustrating a position shift caused by chromatic aberration.

In FIG. 3, a signal at coordinates 303 in an image 300 obtained before chromatic aberration correction is subjected to chromatic aberration correction, and moves to the position of coordinates 302. In other words, the signal of the pixel that is to be located at the coordinates 302 has been shifted to the position of the coordinates 303 in the image 300 due to the chromatic aberration caused by the lens unit 100. The distance from the optical axis position 301 of the lens unit 100 to each coordinates is called the image height. The difference between the coordinates 302 and the coordinates 303, that is, the amount of chromatic aberration, changes depending on the specific optical characteristics of the lens unit 100 or the magnitude of the image height based on the positions of these coordinates. Thus, the first shift amount obtaining unit 105 and the second shift amount obtaining unit 106 store in memories, as lens design information, information indicating the amount of chromatic aberration with respect to the image height for each element of the lens unit 100 or for each type of the lens unit 100.

Figure 4:
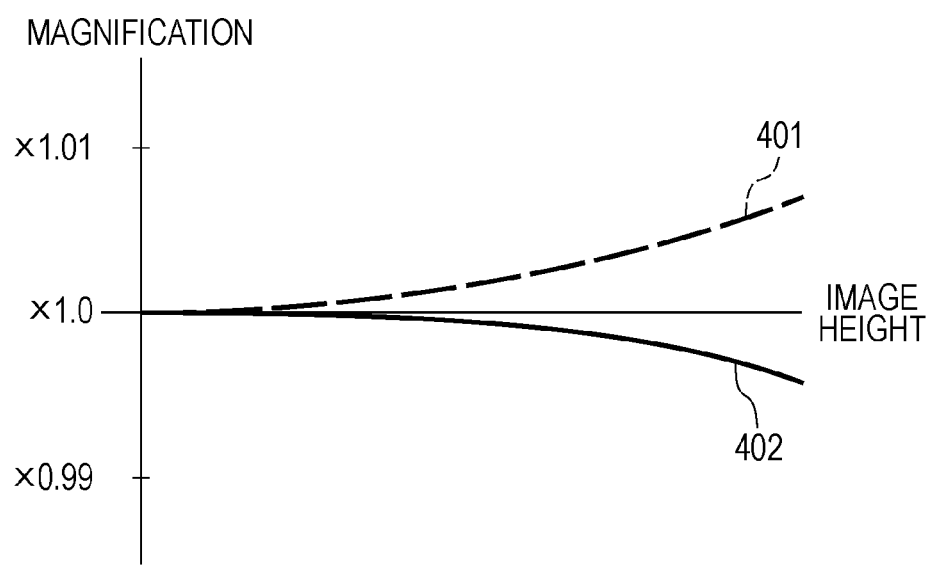
FIG. 4 is a graph illustrating a magnification of an image height for coordinates after chromatic aberration correction with respect to an image height for coordinates before chromatic aberration correction.

FIG. 4 is a graph illustrating a magnification of the image height for the coordinates 303 before chromatic aberration correction with respect to the image height for the coordinates 302 after chromatic aberration correction, where the image height for the coordinates 302 after chromatic aberration correction can be converted into the image height for the coordinates 303 before chromatic aberration correction by being multiplied by a magnification. The coordinates before chromatic aberration correction are calculated by, using the graph illustrated in FIG. 4, multiplying the image height for the desired coordinates by the magnification corresponding to the desired coordinates, and the signal level at the coordinates before chromatic aberration correction in the image obtained before chromatic aberration is determined as the signal level at the desired coordinates after chromatic aberration correction. In FIG. 4, a curve 401 represents the chromatic aberration characteristic of the lens unit 100 for red signals in the present embodiment, and a curve 402 represents the chromatic aberration characteristic of the lens unit 100 for blue signals.

Since an image obtained after chromatic aberration correction is finally output, it is necessary to determine the coordinates 302 of the image obtained after chromatic aberration correction, which are given by real number coordinates. However, the coordinates 303 before chromatic aberration correction corresponding to the coordinates 302 of the image obtained after chromatic aberration correction are not always real number coordinates. Since the image 300 obtained before chromatic aberration correction has only a signal level of a pixel corresponding to real number coordinates, a signal level at coordinates that are not defined by real numbers needs to be interpolated from signal levels of neighboring pixels at real number coordinates. Coordinates before chromatic aberration correction corresponding to coordinates of a pixel of interest in an image obtained after chromatic aberration correction are referred to as aberration coordinates.

Figure 5:
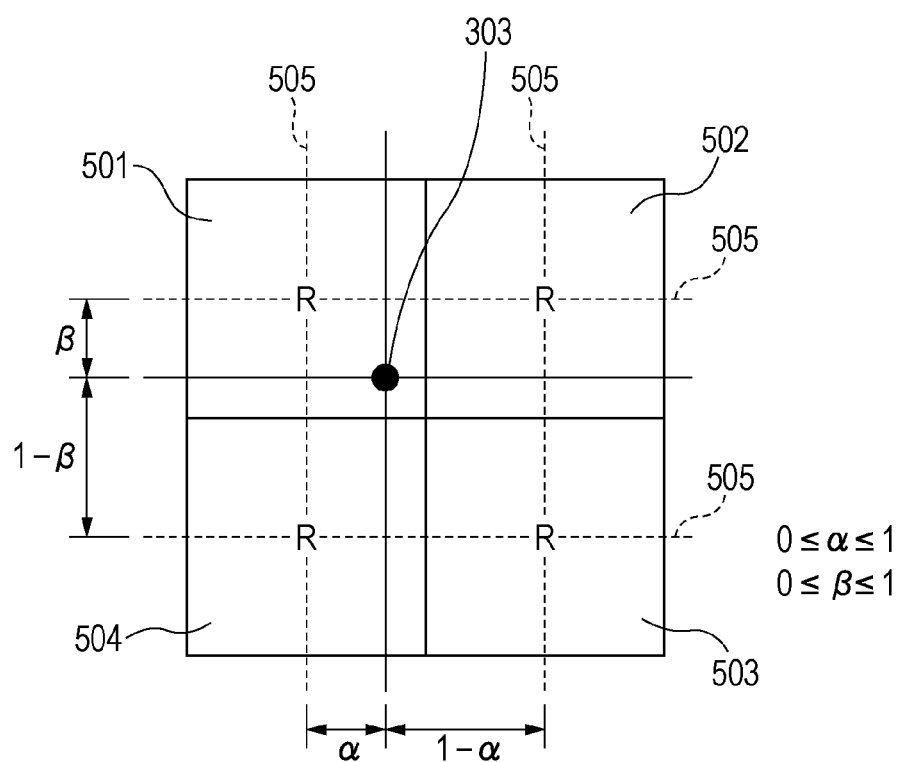
FIG. 5 is a diagram illustrating an example of aberration coordinates in the first embodiment of the present invention.

FIG. 5 is a diagram illustrating an example of the aberration coordinates 303 in the present embodiment.

In FIG. 5, pixels 501, 502, 503, and 504 are pixels at real number coordinates in a red image in which the missing pixels 200 have been interpolated. Dotted lines 505 are lines horizontally and vertically extending from the center-of-gravity positions of the pixels 501, 502, 503, and 504. α represents the amount of shift in the horizontal direction from the aberration coordinates 303 to the center-of-gravity positions of the pixels 501 and 504 in the left column, and β represents the amount of shift in the vertical direction from the aberration coordinates 303 to the center-of-gravity positions of the pixels 501 and 502 in the upper row. In FIG. 5, α and β take values in a range greater than or equal to 0 and less than or equal to 1.

When the aberration coordinates 303 are (Qrx, Qry), the first shift amount obtaining unit 105 determines the amounts of shift α and β using Equations (2) and (3):

$$\alpha = Qrx - int(Qrx) \quad (2)$$

$$\beta = Qry - int(Qry) \quad (3)$$

where int(n) is a function representing the integer part of n.

Then, the first shift correction unit 107 performs bilinear interpolation using the amounts of shifts α and β to calculate the red signal level at the aberration coordinates 303.

When the red signal levels of the pixels 501, 502, 503, and 504 are represented by Pr1, Pr2, Pr3, and Pr4, respectively, in bilinear interpolation, a red signal level Qr at the aberration coordinates 303 can be determined using Equation (4) similar to Equation (1) given above:

$$Qr = \{(1-\alpha) \times Pr1 + \alpha \times Pr2\} \times (1-\beta) + \{(1-\alpha) \times Pr4 + \alpha \times Pr3\} \times \beta \quad (4)$$

The second shift correction unit 108 also performs a process similar to that of the first shift correction unit 107 using a blue image in which the missing pixels 200 have been interpolated, and determines a signal level Qb at the aberration coordinates in the blue image. The above processing is similar to conventional chromatic aberration correction processing.

In the present invention, furthermore, a process for restoring the signal levels of the red and blue high-frequency components is performed. The first high-frequency suppression unit 109 and the second high-frequency suppression unit 110 generate a green signal level for which the high-frequency components are reduced using the amounts of shift α and β at the aberration coordinates, which are determined using Equations (2) and (3), from green signal levels of a pixel of interest 600 whose center of gravity is located at the coordinates 302 in FIG. 3.

Figure 6A:
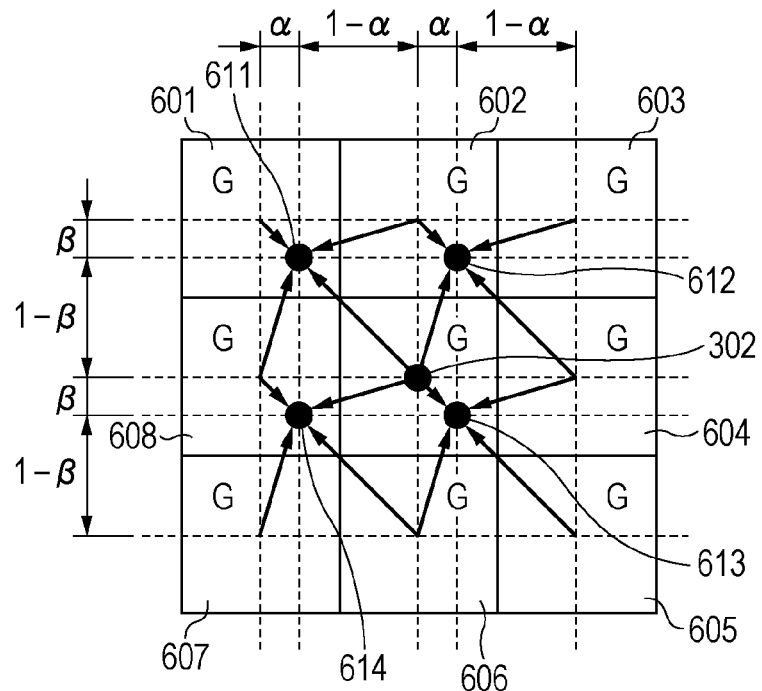
FIG. 6A and FIG. 6B include diagrams illustrating a method in which a first high-frequency suppression unit calculates a green signal level for which the high-frequency components of a pixel of interest are reduced by performing bilinear interpolation using amounts of shift $\alpha$ and $\beta$.
Figure 6B:
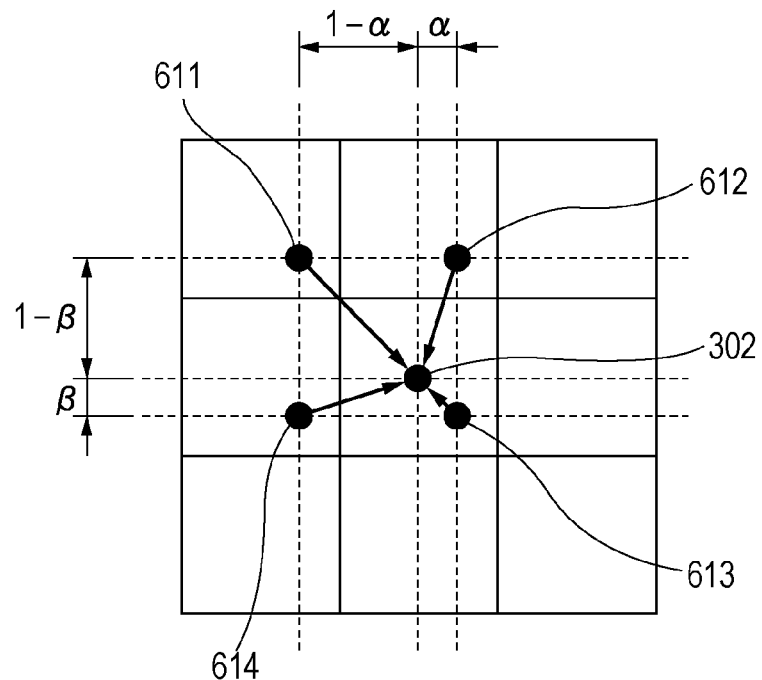

FIG. 6A and FIG. 6B include diagrams illustrating a method in which the first high-frequency suppression unit 109 calculates a green signal level for which the high-frequency components of a pixel of interest are reduced through bilinear interpolation using the amounts of shift α and β determined by the first shift amount obtaining unit 105.

FIG. 6A illustrates a region centered on a pixel of interest located at the coordinates 302 in FIG. 3, including 3×3 adjacent pixels, and the region has four sub-regions each including 2×2 adjacent pixels. A sub-region including pixels 601, 602, 600, and 608 is represented as a first region, and a sub-region including pixels 602, 603, 604, and 600 is represented as a second region. Further, a sub-region including pixels 600, 604, 605, and 606 is represented as a third region, and a sub-region including pixels 608, 600, 606, and 607 is represented as a fourth region.

The amounts of shift α and β determined by the first shift amount obtaining unit 105 are input to the first high-frequency suppression unit 109. The first high-frequency suppression unit 109 computes, by interpolation, signal levels at coordinates 611, 612, 613, and 614, which are shifted by α from the centers of gravity of the pixels in the left column and by β from the centers of gravity of the pixels in the upper row in each of the first to fourth regions, using Equations (5) to (8):

$$Qrg11 = \{(1-\alpha) \times Prg01 + \alpha \times Prg02\} \times (1-\beta) + \{(1-\alpha) \times Prg08 + \alpha \times Prg00\} \times \beta \quad (5)$$

$$Qrg12 = \{(1-\alpha) \times Prg02 + \alpha \times Prg03\} \times (1-\beta) + \{(1-\alpha) \times Prg00 + \alpha \times Prg04\} \times \beta \quad (6)$$

$$Qrg13 = \{(1-\alpha) \times Prg00 + \alpha \times Prg04\} \times (1-\beta) + \{(1-\alpha) \times Prg06 + \alpha \times Prg05\} \times \beta \quad (7)$$

$$Qrg14 = \{(1-\alpha) \times Prg08 + \alpha \times Prg00\} \times (1-\beta) + \{(1-\alpha) \times Prg07 + \alpha \times Prg06\} \times \beta \quad (8)$$

where the signal levels of the pixels 600 to 608 are represented by Prg00 to Prg08, respectively, and the signal levels at the coordinates 611 to 614 are represented by Qrg11 to Qrg14, respectively.

The above signal levels Qrg11 to Qrg14 at the coordinates 611 to 614 are computed, by interpolation, from the signal levels of the neighboring pixels using α and β, which are the same as those used when the signal level at the aberration coordinates 303 is determined, as weighting factors. The signal levels Qrg11 to Qrg14 at the coordinates 611 to 614 are therefore signal levels for which, as the signal levels at the aberration coordinates 303, the high-frequency components are reduced.

The first high-frequency suppression unit 109 further computes, by interpolation, the signal level Qrg00 for which the high-frequency components of the pixel of interest located at the coordinates 302 are reduced, from the signal levels Qrg11 to Qrg14 at the coordinates 611 to 614 using Equation (9). In order to determine the signal level Qrg00 at the center of gravity of the coordinates 303, conversely to the interpolation-based computation described above, the amount of shift from the centers of gravity of the pixels in the right column may be represented by α, and the amount of shift from the centers of gravity of the pixels in the lower row may be represented by β.

$$Qrg00 = \{\alpha \times Qrg11 + (1-\alpha) \times Qrg12\} \times \beta + \{\alpha \times Qrg14 + (1-\alpha) \times Qrg13\} \times (1-\beta) \quad (9)$$

The first subtractor 111 subtracts the green signal level Qrg00 output from the first high-frequency suppression unit 109 from the green signal level output from the color interpolation unit 104 to obtain a green signal level Qrgh having high-frequency components from which the low-frequency components have been removed. As the high-frequency components of the signal level at the aberration coordinates 303 are reduced, the signal level Qrg00 of the pixel of interest becomes a signal level for which the high-frequency components are reduced, and, conversely, the signal level Qrgh becomes a signal level for which a large number of high-frequency components remain. That is, the first high-frequency suppression unit 109 and the first subtractor 111 form a first high-frequency extraction unit that extracts high-frequency components of the green signal level of the pixel of interest in accordance with the degree of reduction in the high-frequency components of the red signal level at the aberration coordinates 303. Similarly, the second high-frequency suppression unit 110 and the second subtractor 112 form a second high-frequency extraction unit that extracts high-frequency components of the green signal level of the pixel of interest in accordance with the degree of reduction in the high-frequency components at the blue signal level for the aberration coordinates 303 is reduced.

The green signal at the coordinates 302 and the red signal at the aberration coordinates 303 are originally generated from the same subject image. Thus, the first adder 113 adds the green signal level Qrgh determined for the pixel of interest at the coordinates 302 to the red signal level Qr determined at the aberration coordinates 303, thus allowing the red high-frequency components at the aberration coordinates 303 to be restored in a pseudo manner. The second high-frequency suppression unit 110, the second subtractor 112, and the second adder 114 also perform similar processing on the blue signal level Qb at the aberration coordinates 303, thus allowing the signal level of the blue high-frequency component at the aberration coordinates 303 to be restored in a pseudo manner.

Then, the chromatic aberration correction unit 115 outputs the red signal level generated by the first adder 113 and the blue signal level generated by the second adder 114 to the signal processing unit 116 as signal levels of the pixel of interest at the coordinates 302. Thus, the signal processing unit 116 can perform image luminance correction, edge enhancement correction, and the like using red, green, and blue signals in which the loss of high-frequency components is suppressed and in which chromatic aberration has been corrected.

As described above, according to the present embodiment, the chromatic aberration correction unit 115 generates a low-frequency component signal by losing high-frequency components of the green signal level at the pixel of interest in accordance with the degree of loss of high-frequency components of the red signal level at the aberration coordinates. Then, the chromatic aberration correction unit 115 generates a signal level having high-frequency components by subtracting the signal level of the low-frequency components from the green signal level obtained before the high-frequency components of the pixel of interest are lost. Further, the chromatic aberration correction unit 115 adds the signal level of the high-frequency components to the red signal level at the aberration coordinates, and outputs the sum as the signal level of the pixel of interest. Accordingly, the digital camera according to the present embodiment is capable of performing chromatic aberration correction in which the patchy distribution of high-frequency components is suppressed.

In the present embodiment, the first high-frequency suppression unit 109 and the second high-frequency suppression unit 110 perform a weighted computation using amounts of shift α and β obtained in advance when generating a green signal level for which high-frequency components are lost in a pixel of interest. However, the configuration is not limited thereto. For example, a configuration including a table that stores filter coefficients corresponding to the amounts of shift α and β in advance, in which filter coefficients corresponding to the amounts of shift α and β are read and the green signal level of a pixel of interest is low-pass filtered, may be used.

However, the first high-frequency suppression unit 109 and the second high-frequency suppression unit 110 in the present embodiment are advantageous because of their simple circuit configuration including an FIR low-pass filter having two taps with coefficients α and β in the horizontal and vertical directions.

In the present embodiment, furthermore, the first high-frequency extraction unit is constituted by the first high-frequency suppression unit 109 and the first subtractor 111, and the second high-frequency extraction unit is constituted by the second high-frequency suppression unit 110 and the second subtractor 112. However, the configuration is not limited thereto. A high-pass filter whose filter coefficients vary in accordance with the degree of loss of the high-frequency component signal level at the aberration coordinates 303 may constitute a high-frequency extraction unit that directly extracts high-frequency components of the green signal level of the pixel of interest in accordance with the reduction in the high-frequency components of the red and blue signal levels at the aberration coordinates.

Second Embodiment

Figure 7:
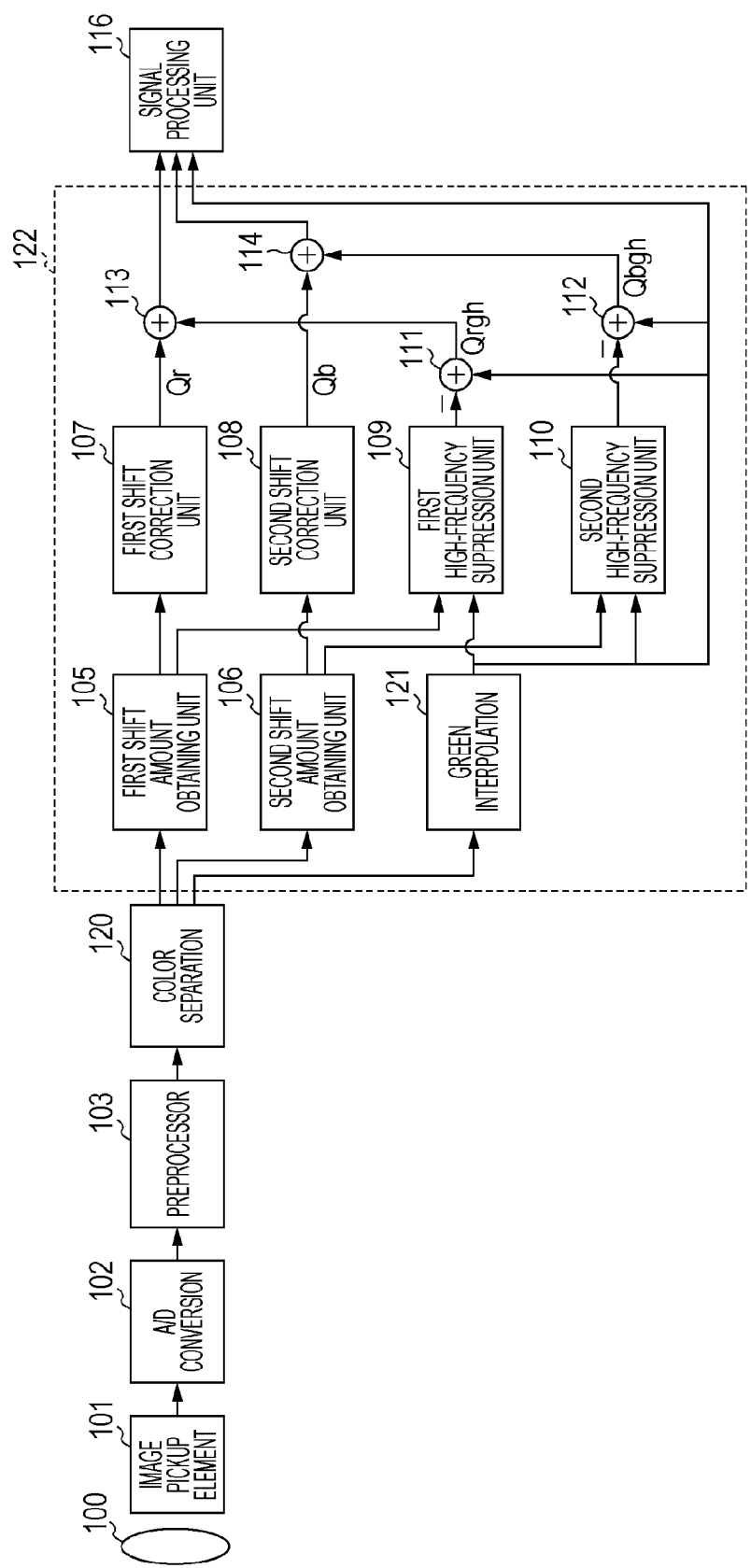
FIG. 7 is a block diagram illustrating a configuration of a digital camera according to a second embodiment of the present invention.

FIG. 7 is a block diagram illustrating a configuration of a digital camera according to the present embodiment. The digital camera in FIG. 7 is different from that in FIG. 1 in that a color separation unit 120 is included in place of the color interpolation unit 104 and a chromatic aberration correction unit 122 that is provided with a green interpolation unit 121 between the color separation unit 120 and the first high-frequency suppression unit 109 and the second high-frequency suppression unit 110 is included.

Elements assigned the same numerals as those in FIG. 1 have a configuration similar to that of the first embodiment, and descriptions thereof are omitted. A description will be given mainly of a configuration different from that of the first embodiment.

The color separation unit 120 separates the digital signal output from the preprocessor 103 into signals of red, green, and blue colors. Unlike the color interpolation unit 104 in FIG. 1, the color separation unit 120 does not perform an interpolation process on missing pixels in images of the separated colors.

Figure 8:
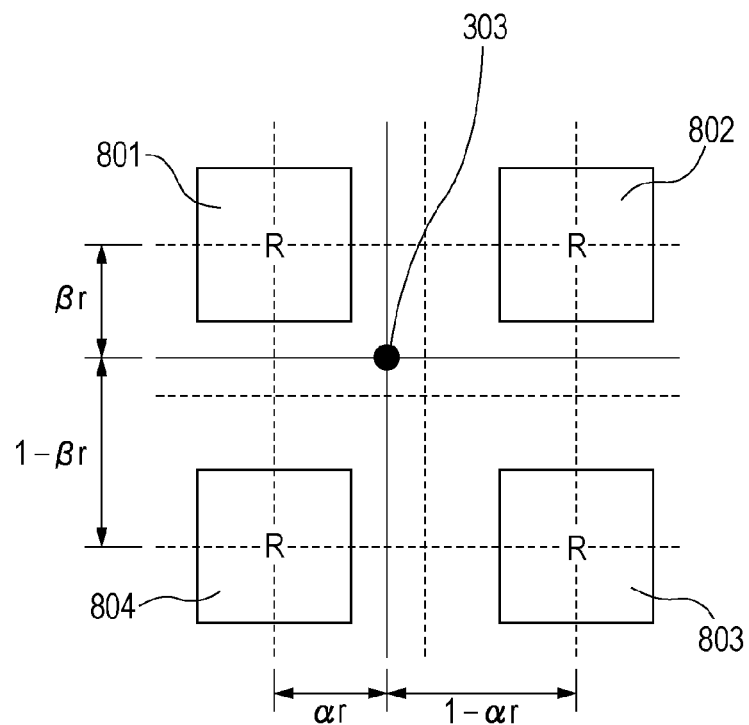
FIG. 8 is a diagram illustrating an example of aberration coordinates in the second embodiment of the present invention.

As in the first embodiment, the first shift correction unit 107 and the second shift correction unit 108 calculate a signal level at the aberration coordinates 303 using bilinear interpolation. FIG. 8 is a diagram illustrating an example of the aberration coordinates 303 in the present embodiment.

In FIG. 8, pixels 801, 802, 803, and 804 are pixels at real number coordinates in a red image. Dotted lines are lines horizontally and vertically extending from the center-of-gravity positions of the pixels 801, 802, 803, and 804, and lines located in the middle thereof. αr represents the amount of shift in the horizontal direction from the center-of-gravity positions of the pixels 801 and 804 in the left column, and βr represents the amount of shift in the vertical direction from the center-of-gravity positions of the pixels 801 and 802 in the upper row. Since missing pixels are not interpolated in the red image, the amounts of shift αr and βr are determined in a manner different from that of the first embodiment. When the aberration coordinates 303 are (Qrx, Qry), the first shift amount obtaining unit 105 determines the amounts of shift αr and βr using Equations (10) and (11):

$$\alpha r = Qrx/2 - int(Qrx/2) \quad (10)$$

$$\beta r = Qry/2 - int(Qry/2) \quad (11)$$

where int(n) is a function representing the integer part of n.

When the signal levels of the pixels 801 to 804 are represented by Pr1 to Pr4, respectively, the first shift correction unit 107 can determine a signal level Qr at the aberration coordinates 303 by substituting αr and βr into the amounts of shift α and β in Equation (2), respectively. The second shift correction unit 108 also performs a process similar to that of the first shift correction unit 107 using a blue image in which missing pixels are not interpolated, and determines a signal Qb at the aberration coordinates 303 in the blue image.

Figure 9:
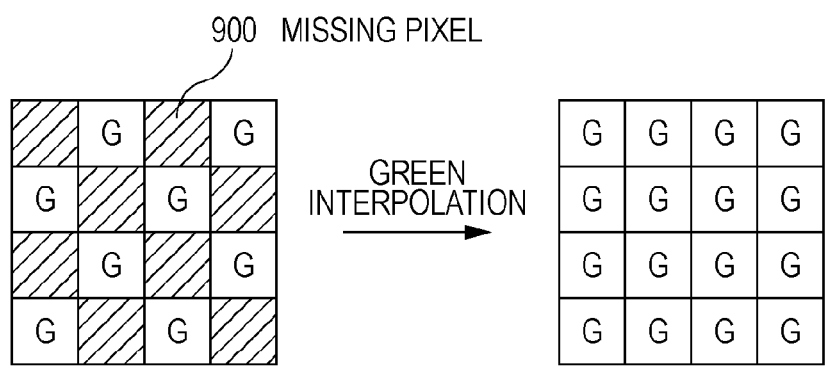
FIG. 9 is a diagram illustrating interpolation processing performed on a green signal.
Figure 10:
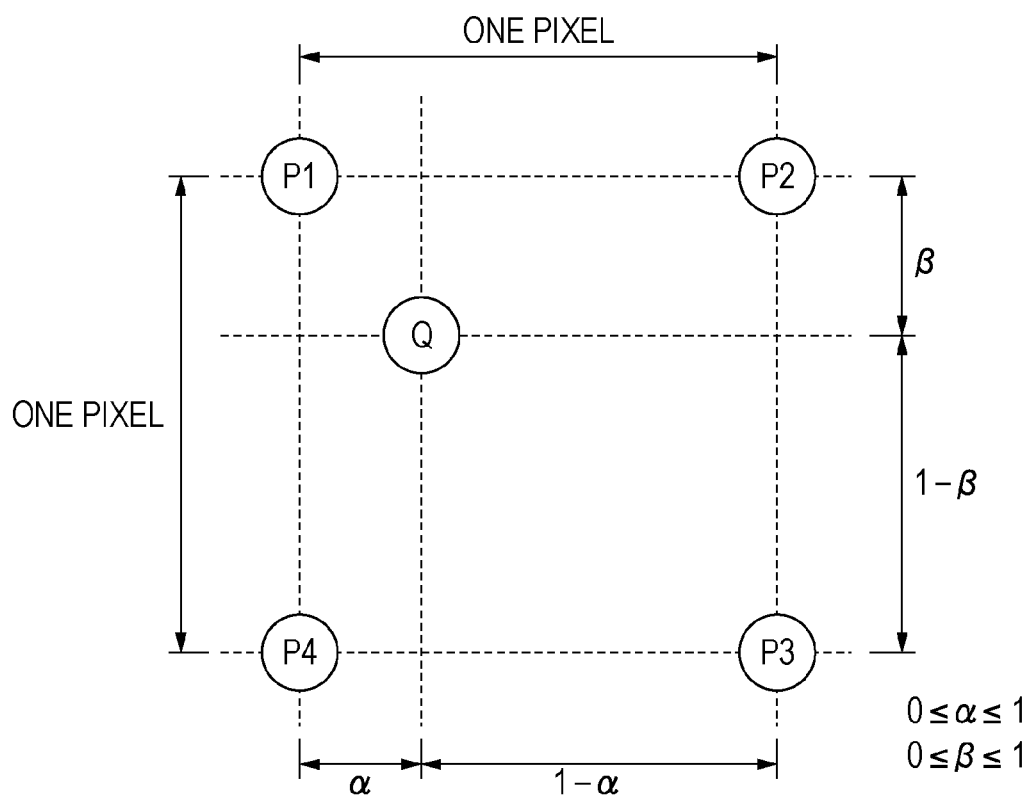
FIG. 10 is a diagram illustrating a computation using bilinear interpolation.

As illustrated in FIG. 9, the green interpolation unit 121 interpolates missing pixels 900 in a green image separated by the color separation unit 120. Then, the first high-frequency suppression unit 109 and the second high-frequency suppression unit 110 generate a green signal level for which the high-frequency components are reduced from the green image in which the missing pixels 900 have been interpolated by the green interpolation unit 121. Here, since the amounts of shift $\alpha r$ and $\beta r$ are amounts of shift in the red image in which missing pixels are not interpolated, the first high-frequency suppression unit 109 determines amounts of shift in the green image in which the missing pixels 900 have been interpolated, using Equations (12) and (13):

$$\alpha g = \alpha r \times 2 - int(\alpha r \times 2) \quad (12)$$

$$\beta g = \beta r \times 2 - int(\beta r \times 2) \quad (13)$$

Here, the signal levels of a region centered on a pixel of interest, which includes 3×3 adjacent pixels, are represented by Prg00 to Prg08. The first high-frequency suppression unit 109 substitutes $\alpha g$ and $\beta g$ into the amounts of shift $\alpha$ and $\beta$ in Equations (5) to (9) to obtain a green signal level Qrgh having high-frequency components from which the low-frequency components of the pixel of interest have been removed. Similarly, the second high-frequency suppression unit 110 also determines a green signal level Qbgh having high-frequency components from which the low-frequency components of a pixel of interest have been removed. Then, the first adder 113 and the second adder 114 restore the signal levels of the red and blue high-frequency components in a pseudo manner using the signal levels Qrgh and Qbgh.

As described above, according to the present embodiment, it is possible to obtain red and blue signal levels in which signal levels of high-frequency components are restored after chromatic aberration correction, without interpolating missing pixels in a red image and a blue image.

Further, while the first and second embodiments have been described in the context of bilinear interpolation by way of example, similar advantages can also be obtained with another filter having an FIR filter structure (for example, bicubic interpolation).

Further, while the first and second embodiments have been described in the context of alignment of red signals and blue signals with the positions of green signals, by way of example, the configuration is not limited thereto. A configuration in which, with the position of a signal of a first color, the position of a signal of any other color, that is, a second color or a third color, is aligned may be used, and the position of other color signals may be aligned with, for example, a red signal or a blue signal. Furthermore, in order to correct on-axis chromatic aberration instead of magnification chromatic aberration, even in a case where components of other color signals are aligned with the position of a signal of a certain color, chromatic aberration correction can be performed with a similar configuration so as to suppress the patchy distribution of high-frequency components.

Moreover, the first and second embodiments can also be implemented by, instead of a digital camera, a personal computer or printer having an image processing function. Such an image processing apparatus may be provided with, instead of an image obtaining unit constituted by the units from the lens unit 100 to the A/D conversion unit 102, an image obtaining unit configured to read an image from a recording medium or to obtain an image over a network via a communication interface.

Other Embodiments

The foregoing embodiments can also be implemented in software by using a computer (or a CPU, MPU, or the like) of a system or an apparatus.

Thus, in order to implement the foregoing embodiments using a computer, a computer program itself, which is supplied to the computer, also implements the present invention. That is, a computer program itself for implementing the functions of the foregoing embodiments is also an aspect of the present invention.

Note that a computer program for implementing the foregoing embodiments may be in any form as long as the computer program can be read by a computer. For example, the computer program may be configured using an object code, a program executed by an interpreter, script data supplied to an OS, or the like. However, the form is not limited thereto.

A computer program for implementing the foregoing embodiments is supplied to a computer via a storage medium or wired/wireless communication. Examples of a storage medium for supplying the program include magnetic storage media such as a flexible disk, a hard disk, and a magnetic tape, optical/magneto-optical storage media such as an MO, a CD, and a DVD, and a non-volatile semiconductor memory.

Methods for supplying a computer program using wired/wireless communication include a method of utilizing a server on a computer network. In this case, a data file (program file) that can be a computer program forming the present invention is stored in a server. The program file may be in execution format or source code.

Then, the program file is supplied to a client computer that accesses the server by downloading. In this case, the program file can also be divided into a plurality of segment files and the segment files can be distributed and arranged in different servers.

That is, a server apparatus that provides a client computer with a program file for implementing the foregoing embodiments is also an aspect of the present invention.

Furthermore, a storage medium storing an encrypted version of a computer program for implementing the foregoing embodiments may be distributed, and key information for decryption may be supplied to a user satisfying predetermined conditions so that the user is permitted to install the computer program into a computer owned by the user. The key information can be supplied by, for example, being downloaded from a homepage via the Internet.

Furthermore, a computer program for implementing the foregoing embodiments may be performed using the functionality of an existing OS operating on a computer.

Furthermore, a computer program for implementing the foregoing embodiments may be configured by firmware, a portion of which is attached to a computer, such as an extension board, or may be executed by a CPU provided in the extension board.

According to the present invention, an image processing apparatus and an image processing method in which chromatic aberration correction is performed to prevent a patchy distribution of high-frequency components of a signal level in an image can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST

100 lens unit
101 image pickup element
102 A/D conversion unit
103 preprocessor 104 color interpolation unit
105 first shift amount obtaining unit
106 second shift amount obtaining unit
107 first shift correction unit
108 second shift correction unit
109 first high-frequency suppression unit
110 second high-frequency suppression unit
111 first subtractor
112 second subtractor
113 first adder
114 second adder
115, 122 chromatic aberration correction unit
116 signal processing unit
120 color separation unit
121 green interpolation unit

The invention claimed is:

1. An image processing apparatus comprising:
an image obtaining unit adapted to obtain an image having a plurality of colors, the image being generated using an image pickup element including a plurality of pixels;
a shift amount obtaining unit adapted to obtain an amount of shift of light flux of a second color with respect to light flux of a first color, the amount of shift being caused by optical characteristics of a lens through which light flux that arrives at the image pickup element is transmitted;
a shift correcting unit adapted to interpolate a signal level of the second color at aberration coordinates from signal levels of pixels having the second color around the aberration coordinates, the aberration coordinates representing a position that is shifted from a position of a pixel of interest by the amount of shift; and
an generating unit adapted to generate, as a signal level of a pixel of the second color in the pixel of interest, a signal level in which a degree of reduction in a high-frequency signal level in the signal level of the second color at the aberration coordinates is suppressed, the reduction being caused by interpolation performed by the shift correcting unit.

2. The image processing apparatus according to claim 1, further comprising:
a second shift amount obtaining unit adapted to obtain an amount of shift of light flux of a third color with respect to the light flux of the first color, the amount of shift being caused by optical characteristics of a lens through which light flux that arrives at the image pickup element is transmitted; and
a second shift correcting unit adapted to interpolate a signal level of the third color at aberration coordinates from signal levels of pixels having the third color around the aberration coordinates, the aberration coordinates representing a position that is shifted from a position of a pixel of interest by the amount of shift obtained by the second shift amount obtaining unit,
wherein the generating unit generates, as a signal level of a pixel of the third color in the pixel of interest, a signal level in which a degree of reduction in a high-frequency signal level in the signal level of the third color at the aberration coordinates is suppressed, the reduction being caused by interpolation performed by the second shift correcting unit.

3. The image processing apparatus according to claim 1, wherein the first color is green, and the second color is red or blue.

4. An image processing method comprising:
an image obtaining step of obtaining an image having a plurality of colors, the image being generated using an image pickup element including a plurality of pixels;
a shift amount obtaining step of obtaining an amount of shift of light flux of a second color with respect to light flux of a first color, the amount of shift being caused by optical characteristics of a lens through which light flux that arrives at the image pickup element is transmitted;
a shift correcting step of interpolating a signal level of the second color at aberration coordinates from signal levels of pixels having the second color around the aberration coordinates, the aberration coordinates representing a position that is shifted from a position of a pixel of interest by the amount of shift;
a generating step of generating, as a signal level of a pixel of the second color in the pixel of interest, a signal level in which a degree of reduction in a high-frequency signal level in the signal level of the second color at the aberration coordinates is suppressed, the reduction being caused by interpolation performed in the shift correcting step.

5. A non-transitory computer-readable storage medium that stores a program for causing a computer to execute the image processing method according to claim 4.

* * * * *